No. 770,694. Patented September 20, 1904

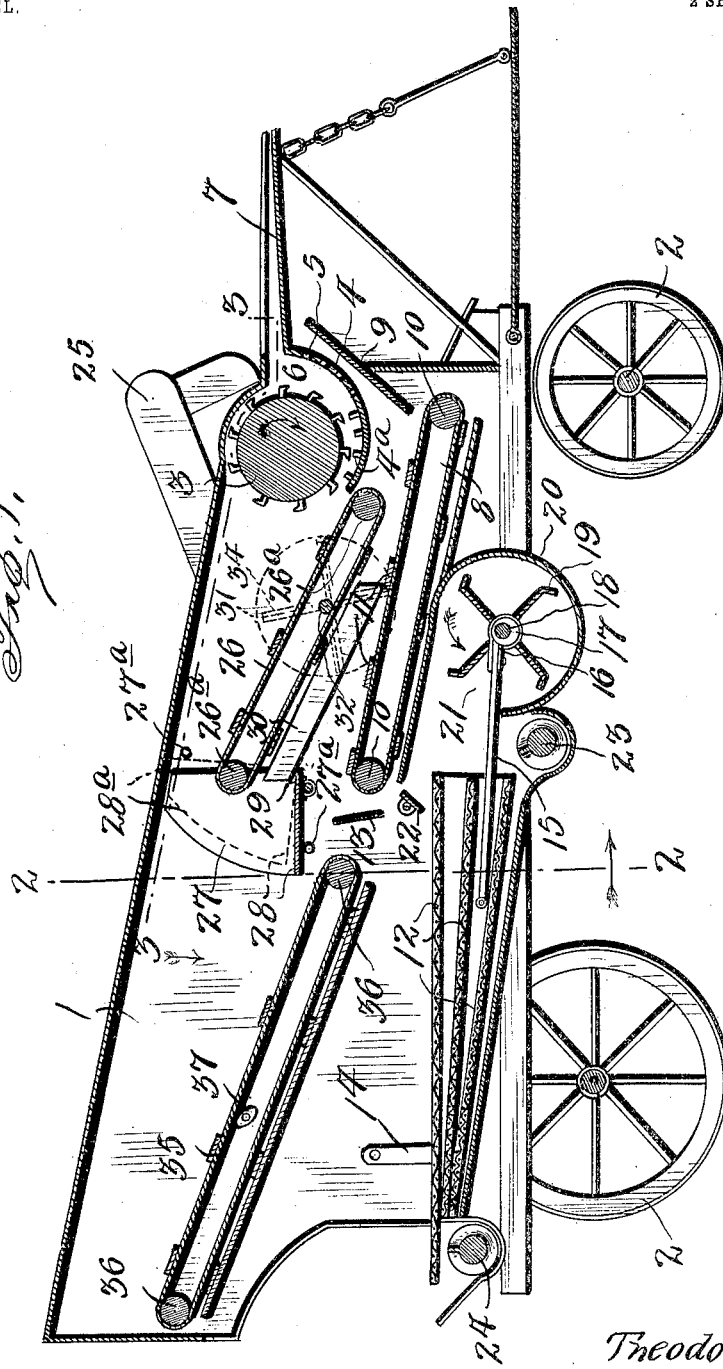

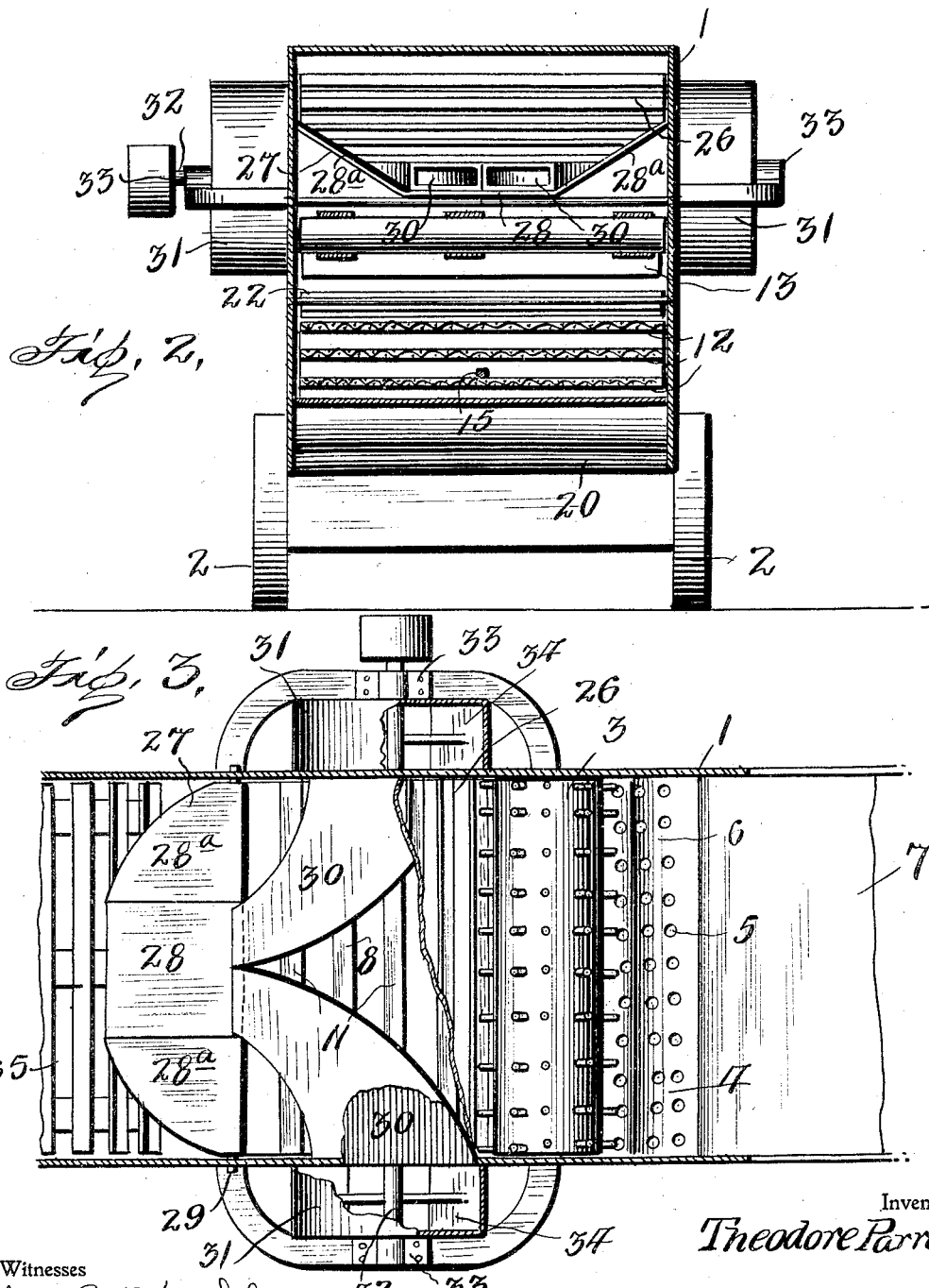

UNITED STATES PATENT OFFICE.

THEODORE PARROTT, OF LAKE CHARLES, LOUISIANA.

GRAIN SEPARATOR AND THRESHER.

SPECIFICATION forming part of Letters Patent No. 770,694, dated September 20, 1904.

Application filed October 12, 1903. Serial No. 176,709. (No model.)

*To all whom it may concern:*

Be it known that I, THEODORE PARROTT, a citizen of the United States, residing at Lake Charles, in the parish of Calcasieu and State of Louisiana, have invented certain new and useful Improvements in Grain Threshers and Separators; and I do declare the following to be a full, clear, and exact description of the invention, such as will enable others skilled in the art to which it appertains to make and use the same.

My invention relates to certain new and useful improvements in machines for threshing and separating rice and other grains.

The object of the invention is to improve and simplify the construction and operation of machines of this character and thereby render them more efficient and durable in use.

With this and other objects in view the invention consists of certain novel features of construction, combination, and arrangement of parts, as will be more fully described, and particularly pointed out in the appended claims.

In the accompanying drawings, Figure 1 is a vertical longitudinal sectional view through my improved thresher and separator. Fig. 2 is a vertical transverse sectional view taken on the line 2 2 of Fig. 1. Fig. 3 is a detail horizontal sectional view taken on the line 3 3 of Fig. 1.

Referring to the drawings by numerals, 1 denotes the body of my improved machine, which may be of any desired construction and is preferably mounted upon supporting-wheels 2. In the upper portion at the forward end of the body is mounted the usual rotary threshing-cylinder 3, which coacts with a concave 4, the front portion of which is perforated or apertured, as at 5, to provide a screen or grate in advance of the toothed portion $4^a$ at the rear end. This forward toothless portion of the concave extends as high as the center of the cylinder and forms a tapering throat 6, into which the grain to be threshed is fed from an inclined feeding-table 7. Owing to the great width of the throat 6 at its inlet end and the height at which the feeding-table is disposed with respect to the cylinder, the grain as it is forced over the edge of the table will bend downwardly into the throat 6 without coming into contact with the teeth or the cylinder until it has almost reached the tooth portion of the concave. By this construction the grain will be broken but very little as it is fed to and passes between the cylinder and concave, and any loose kernels of grain will be permitted to drop through the grate 5 upon a grain-conveyer 8 without first passing over the tooth portion $4^a$ of the concave, where it is liable to be cracked and broken. A deflector-board 9 is disposed obliquely below the concave and deflects the falling grain upon the conveyer 8, which is preferably an endless belt of canvas or other fabric passed about rollers 10 and provided with cross-slats 11. Said endless conveyer 8 is slightly inclined upwardly and rearwardly and extends from the front end of the body 1 to about the center of the same, its discharge end being directly over the front end of a series of three shaking-screens 12. The loose grain passing through the concave falls upon said conveyer 8, which discharges it upon the front end of the screens 12. A transverse stop-board 13 is provided at the rear end of the conveyer to prevent the grain from being thrown too far rearwardly upon the screens.

The three screens 12 are rigidly connected and are suspended in any desired manner, preferably by hangers 14. In order to oscillate them a rod 15 has one end attached to them, and its other end is provided with a strap 16, which surrounds an eccentric 17 upon a transverse shaft 18. Said shaft also carries a rotary fan 19, inclosed in a casing 20, having an opening 21, through which the blast of air created by the fan escapes. Said air-blast passes above and between the screens 12 and blows the chaff and dust rearwardly out of the rear end of the machine. A blast-regulator 22 is provided above the front end of the uppermost screen 12 and below the stop-board 13 and the rear end of the conveyer 8. Said regulator is in the form of a transverse board pivotally mounted in the sides of the body so as to be swung to any desired angle to direct the blast of air from the fan 19.

The screens 12 as they are oscillated by the eccentric-rod 15 thoroughly screen the grain. The good portion passing through the screens falls upon the inclined bottom of the body 1 and rolls down into the usual grain-auger 23 and the unshelled or partially-threshed portion passes over the rear ends of the screens into the usual return-auger 24, from which it is conveyed by the usual return-elevator 25 to the front of the machine, where it is discharged into the feed-throat 6 to be rethreshed, as is common in machines of this character. The straw as it leaves the cylinder and concave falls upon an upwardly and rearwardly inclined endless conveyer 26, which discharges it upon a tilting blast-pan 27.

Said straw-conveyer 26, which is passed about the rollers 26ª, is disposed directly above the grain-conveyer 8, and the pan 27 is between the rear ends of the two conveyers. The pan 27 comprises a bottom 28 and two inclined sides 28ª, which direct the straw as it falls upon them from the conveyer 26 upon the bottom 28. The pan is mounted so as to tilt in a vertical plane by securing to its bottom 28 along its forward edge a bar 29, the ends of which are journaled in the sides of the body 1 of the machine. Stops 27ª are provided to limit the tilting movement of the pan. By this construction the pan may tilt, as indicated by the dotted lines in Fig. 1, according to the weight of the straw. Both ends of the pan are open, and into the center of the forward end close to its bottom 28 project two discharge-pipes 30, which lead from fan-casings 31, mounted upon the outside of the body of the machine. One of said fan-casings is secured upon each side of the machine at opposite points, and a transverse shaft 32 passes through the body of the machine and through said casing and is journaled in bearings secured upon brackets 33, projecting from the sides of the body. Fans 34 are secured upon said shaft in said casings, and the blast of air created by them and discharged through the pipes 30 into the pan 27 is directed upwardly or downwardly by the pan, according to its position, which is regulated by the weight of the straw, as previously explained. It will be seen that by means of this pan 27 the straw will be gathered and thrown into the direct blast of air, which will cause any loose grain to be separated from the straw and fall upon the screens 12. The straw as it leaves the pan falls upon an upwardly and rearwardly inclined endless conveyer 35, which discharges it at the rear end of the machine. Said conveyer is passed about rollers 36 and is preferably made so as to permit any loose grain to fall through it. A knocker 37 in the form of a flat or elliptical wheel or pulley is provided to shake the upper stretch of the conveyer to cause the grain to separate from the straw.

In the operation of the machine the various parts are set in motion by suitable gearing (not illustrated) and are driven in the directions indicated by the arrows in Fig. 1. The rice or other grain is fed from the table 7 into the throat 6 and is thoroughly threshed as it passes between the cylinder and concave. The threshed grain falls through the concave upon the conveyer 8 and is discharged through a blast of air from the fan 19 upon the screens 12, as previously explained, and the straw passes off of the rear end of the concave upon the conveyer 26, which discharges it into the pan 27. As it falls upon the pan the inclined sides of the same direct it toward the center into the air-blast from the fans 34, which air-blast will separate any loose grain which may be held in the straw. The straw passes from the pan upon the conveyer 35, which discharges it out of the rear end of the machine, as previously stated.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. In a threshing-machine, the combination with a cylinder, a concave, and a straw-conveyer, of a pan below the discharge end of said conveyer and provided with inclined sides adapted to direct the straw to its center, a fan or blower, and an air-blast pipe leading from said fan to the center of said pan, substantially as described.

2. In a threshing-machine, the combination with a cylinder, a concave and a straw-conveyer, of a tilting pan below the discharge end of said conveyer, said pan being provided with inclined sides to direct the straw to its center, inclosed fans mounted at each side of said conveyer, and air-blast pipes leading from said fans to the center of said pan, substantially as described.

3. In a grain-separator, the combination with a straw-carrier, of a tilting pan pivotally mounted at the discharge end of said carrier, said pan having open ends and inclined sides adapted to direct the straw to its center, and means for forcing a blast of air over the center of said pan, substantially as described.

4. The combination with threshing mechanism, of a carrier to convey material therefrom, means to discharge a rearwardly-directed air-blast, of less width than the carrier, under the same and at the rear end thereof, and means at the rear end of the carrier and extending downwardly below the same and having downwardly-converging devices forming inclined planes onto which the material drops from the carrier, said inclined planes acting by gravity to laterally contract the stream of the said material discharged from the carrier and direct such material into the air-blast, substantially as described.

5. In combination with a thresher mechanism, an endless conveyer for the threshed grain dropped therefrom, a screen having its front end below the discharge portion of the conveyer, means to discharge a rearwardly-directed blast over the screen, a blast-regulator over the front portion of the screen and an inclined stop-board over the front portion of the screen in rear of the discharge portion of the conveyer, said stop-board forming a deflector to intercept the grain discharged from the conveyer and cause the same to drop on the front portion of the screen in rear of the blast-regulator.

In testimony whereof I have hereunto set my hand in presence of two subscribing witnesses.

THEODORE PARROTT.

Witnesses:
R. G. MAGUIRE,
G. N. PICKERILL.